United States Patent [19]

Chung

[11] Patent Number: 4,734,472

[45] Date of Patent: Mar. 29, 1988

[54] METHOD FOR PREPARING FUNCTIONAL ALPHA-OLEFIN POLYMERS AND COPOLYMERS

[75] Inventor: Tze-Chiang Chung, Bridgewater, N.J.

[73] Assignee: Exxon Research and Engineering Company, Florham Park, N.J.

[21] Appl. No.: 945,817

[22] Filed: Dec. 24, 1986

[51] Int. Cl.[4] ................... C08F 30/06; C08F 30/00
[52] U.S. Cl. ......................... 526/239; 525/326.6; 525/337; 525/351; 525/369
[58] Field of Search ............ 526/239; 525/12, 326.6, 525/369, 351, 337

[56] References Cited

U.S. PATENT DOCUMENTS

| | | | |
|---|---|---|---|
| 2,457,603 | 12/1948 | Salzberg et al. | 526/239 |
| 3,093,687 | 6/1963 | Clark et al. | 526/239 |
| 3,128,254 | 4/1964 | D'Alelio | 526/239 |
| 3,399,175 | 8/1968 | D'Alelio | 526/239 |
| 3,492,277 | 1/1970 | Clark | 526/155 |
| 3,852,314 | 12/1974 | Hamanaka et al. | 526/329.7 |
| 3,880,689 | 4/1975 | Rolker et al. | 430/117 |
| 3,900,320 | 8/1975 | Rolker et al. | 430/324 |
| 4,439,542 | 3/1984 | Bonny | 502/207 |
| 4,511,454 | 4/1985 | Bonny | 502/207 |
| 4,539,278 | 9/1985 | Williams et al. | 430/967 |

OTHER PUBLICATIONS

"Recent Developments in Chemical Modifications of Polydienes", Pinazzi et al., Applied Polymer Symposium, No. 26, pp. 73-97, 1975.

*Primary Examiner*—Joseph L. Schofer
*Assistant Examiner*—N. Sarafin
*Attorney, Agent, or Firm*—Richard E. Nanfeldt

[57] ABSTRACT

The present invention relates to a process for the preparation of functional alpha-olefin homo- and copolymers by polymerization through a borane monomer intermediate.

Borane monomers, derived from mono-hydroboration of appropriate dienes with dialkyl borane, have been found to be stable to Ziegler-Natta catalysts. In turn, the borane homo- and copolymers are easily converted to a variety of other functionalities; e.g., alcohols, aldehydes, amines, etc.

3 Claims, No Drawings

METHOD FOR PREPARING FUNCTIONAL ALPHA-OLEFIN POLYMERS AND COPOLYMERS

FIELD OF THE INVENTION

The present invention relates to a process for the preparation of functional alpha-olefin homo- and copolymers by polymerization through a borane monomer intermediate.

BACKGROUND OF THE INVENTION

It is normally difficult to prepare oxygen and nitrogen functional homo- and copolymers by Ziegler-Natta (Z-N) polymerization. The Lewis acid components (Ti and Al) of this catalyst will tend to complex with the non-bonded electron pairs on N and in preference to complexation with the pi electrons of the double bonds of the monomer. The net result is the deactivation of the active polymerization sites or the poisoning of the catalyst.

There are some reports of copolymerization of functional monomers with other alpha-olefins. For example, Clark, U.S. Pat. No. 3,492,277 (1970) has described a method of rendering polar vinyl monomers sufficiently unreactive to allow them to copolymerize with alpha-olefins without destroying the Z-N catalysts which consists of pretreating polar monomers with an organo-aluminum compound.

Ester copolymers are especially useful because they are less reactive with the Z-N catalysts than some other oxygenated functionalities like—COOH. Thus, copolymers of esters, like methyl undecylinic ester, and short chain alpha-olefins, like ethylene and propylene, are described in Japanese patent application Nos. 57-152767, 57-188976, and 57-188997. Copolymers of methyl undecylinic ester and long chain alpha-olefins, e.g., 1-octene, are described in U.S. Pat. No. 4,518,757 (1984). Nevertheless, the levels of ester functional group incorporation for both of these copolymers remains low, i.e., <5 mole percent. The incorporation for both of high levels of ester functionality up to the levels of completely (100%) functional homopolymers preferentially requires even more sterically hindered ester monomers, such as 2,6-di-phenyl phenyl 10-undecanonate ("Polymers and Copolymers from W-Functionality-Substituted Alpha-Olefins", Ph.D. thesis by M. D. Purgett, February, 1984, University of Massachusetts).

The corresponding low level acid copolymers (U.S. Pat. No. 4,523,929 and U.S. patent application No. 625,973, now U.S. Pat. No. 4,586,937) have been obtained by hydrolysis of ester copolymers. However, the ester polymer is not a particularly versatile intermediate. For example, it is not convenient to convert the ester functional polymers to other functional (e.g., —OH, —NH$_2$) polymers by simple mild chemical treatments.

Borane compounds are valuable intermediates in organic synthesis (H. C. Brown, "Organic Synthesis via Boranes", Wiley-Interscience, 1975). However, borane functional polymers are rare, being generally limited to only polydiene (e.g., polybutadiene or polyisoprene) backbones. Furthermore, polyborane polymers have previously been prepared by only post-polymerization modification processes, rather than direct polymerization (C. Pinazzi, J. C. Broose, A. Pleurdean and D. Reyo, *Applied Polymer Symposium*, 26, 73 [1975]). Polymer modification processes never achieve a 100% conversion.

SUMMARY OF THE PRESENT INVENTION

The present invention describes a unique, novel process for preparing functional olefin homo- and copolymers. This process involves the use of borane monomers and polymers as intermediates. The borane monomers and polymers are stable to Z-N catalysts, yet serve as valuable intermediates for conversion to a plurality of other functional homo- and copolymers.

The borane monomers are formed by reacting a di-olefin with a dialkylborane-THF solution to form the borane monomer. The borane monomer can be polymerized to a polyborane polymer by means of Z-N catalyst. The borane monomer can also be copolymerized with another alpha-olefin to form a borane copolymer. The borane homo- or copolymer can be reacted with a mixture of an inorganic base and a peroxide to form an alcohol. The polyborane homo- or copolymer can be reacted with NH$_2$OSO$_3$R to form an organic amine. Alternatively, the polyborane homo- or copolymer can react with a mixture of CO and K(i-C$_3$H$_7$O)$_3$BH to form an aldehyde.

The instant invention is distinct from the prior art for several reasons. First, the instant invention is not limited to low levels of functionality; functionality levels extending to essentially 100% functional homopolymers are possible. Secondly, borane monomers are directly polymerizabe to highly versatile polyborane polymers and copolymers which can be converted under mild conditions to polymers with other functionalities (e.g., —NH$_2$,—CHO) by any of the conversion methods detailed in H. C. Brown's book "Organic Synthesis via Boranes", Wiley-Interscience, 1975.

GENERAL DESCRIPTION

The process of the instant invention is depicted as follows:

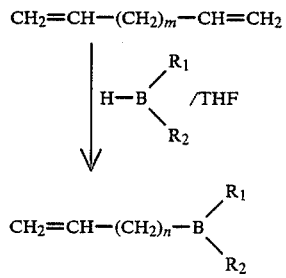

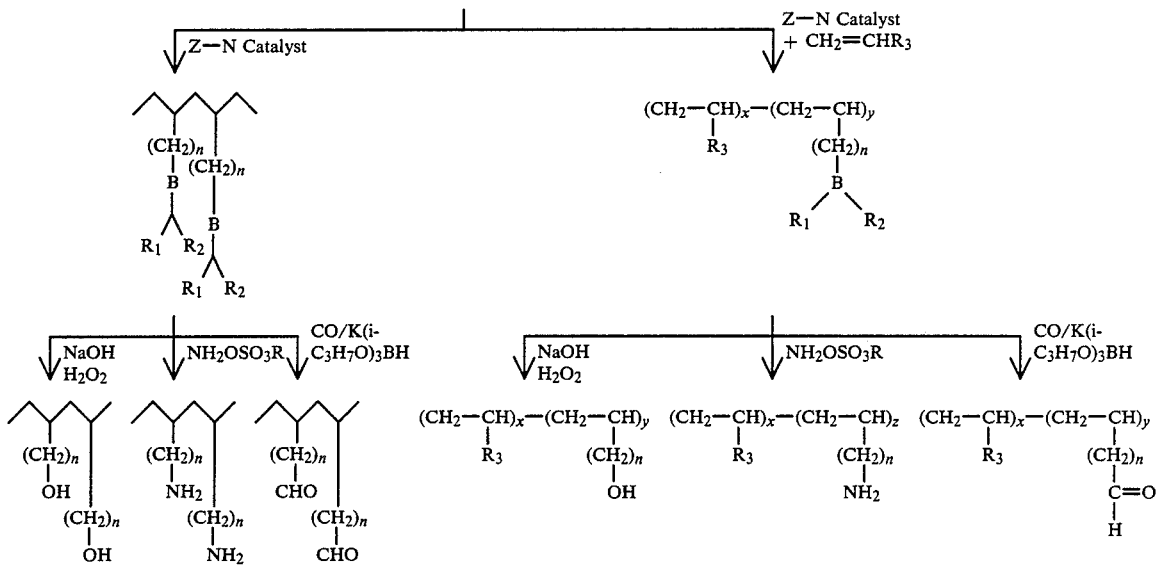

wherein n=3 to 12; $R_1$ and $R_2$ are alkyl or cycloalkyl groups having about 1 to about 10 carbon atoms, such as [3,3,1] bicyclononane; $R_3$ is hydrogen or an alkyl group having about 1 to about 20 carbon atoms; x is about 1 to about 99.9 mole percent, more preferably about 50 to about 99.5, and most preferably about 80 to about 99; and y is about 0.1 to about 99 mole percent, more preferably about 0.5 to about 50, and most preferably about 1 to about 20.

The borane monomer is prepared by reacting a diolefin having the formula:

$CH_2=CH-(CH_2)_m-CH=CH_2$ wherein m is about 1 to 10, such as 1,7-octadiene, 1,5-hexadiene or 1,4-pentadiene, with a dialkylborane solution, such as 9-Borobicyclo [3,3,1] nonane in tetrahydrofuran (9-BBN/THF), under an inert blanket, such as $N_2$, at a temperature of about $-10°$ to about 50° C.

The borane monomer can be polymerized with itself or with an alpha-olefin having about 2 to about 22 carbon atoms to form a polyborane homopolymer or a polyborane copolymer. The polymerization of the polyborane with itself or with the alpha-olefin is done in the presence of a Z-N catalyst, such as $TiCl_3AA-Al(Et)_2Cl$, in an aromatic hydrogen solvent, such as toluene, at about room temperature for a period of about 1 to 6 hours to form the polyborane homo- or copolymer.

The polyborane homopolymer or copolymer can be converted into an alcohol by reaction with an inorganic base/peroxide, such as sodium hydroxide/hydrogen peroxide, at a temperature of about 55° to about 25° C. for about 8 to about 1 hours. Alternatively, the polyborane homo- or copolymer can be reacted with $NH_2OSO_3R$ at a temperature of about 90° to about 100° C. for a period about 3 to about 5 hours to form an amine. The polyborane homopolymer or copolymer can be reacted with a mixture of $CO/K(i-C_3H_7O)_3BH$ for a period of about 2 to about 5 hours to form an aldehyde.

DESCRIPTION OF THE PREFERRED EMBODIMENTS

The organoboranes and Ziegler-Natta catalyst were always handled under inert atmosphere of nitrogen or argon with careful exclusion of both oxygen and water. All glassware, syringes and needles were oven dried at 150° C. for two hours before use. The hot glassware was assembled while cooled under a flow of nitrogen or evacuated in pumping chamber before moving into the dry box.

EXAMPLES

Example 1

Preparation of Monomer B-(7-Octen-1-yl)-9-BBN

A dry 500 ml flask was equipped with a magnetic stirring bar and a connecting tube leading to a nitrogen source. The flask was thoroughly flushed with nitrogen before the injection inlet was capped with a rubber serum stopple. A slight positive pressure of nitrogen was maintained thereafter. The flask was charged via syringe with 60 ml of 1,7-octadiene. To the stirred diene solution was then added (via syringe) 200 ml of the 0.5 M 9-BBN-THF solution. Sufficient time was allowed to ensure complete reaction, then the solvent and unreacted diene were recovered by reducing pressure. B-(7-octen-1-yl)-9-BBN monomer (19.4 g, 84%) was distilled at 140° C. under 10 μm pressure. Spectroscopic evidences by IR and NMR spectra confirmed the expected molecule structure of monomer. IR: 3,070 cm$^{-1}$ ($C=CH_2$ stretching), 2,850–2,925 cm$^{-1}$ (C—H stretching), 1,807 cm$^{-1}$ (overtone), 1,640 cm$^{-1}$ ($C=C$ stretching), 1,440 cm$^{-1}$d ($CH_2$ bending), 1,370 cm$^{-1}$ ($CH_2$ wagging), 905 cm$^{-1}$ ($CH_2=CH$ bending), 720 cm$^{-1}$ ($CH_2$ rocking). 'HMR: $\delta_1$=4.9–5.2 ppm ($CH_2=C$ terminal), $\delta_2$=5.6–6.2 ppm (—CH=C), $\delta_3$=1.5–1.9 ppm ($CH_2$), intensity ratio. $\delta_1:\delta_2:\delta_3$=2:1:26. "B NMR: single hand $\delta$=88.2 ppm (trialkylborane) relative to $BF_s.0Zt_2$.

Example 2

Preparation of Monomer, B-(5-Hexen-1-yl)-9-BBN

Following the procedure of Example 1, 190 ml (1.6 mole) of 1,5-hexadiene was reacted with 800 ml (0.5 M) 9-BBN/THF solution. The reaction was effected with constant stirring at room temperature. After a period of three hours, excess 1,5-hexadiene and THF solvent were stripped by vacuum pumping at room temperature. Pure B-(5-hexen-1-yl)-9-BBN (54 g) was obtained by distillation at 130° C. with low pressure 10 μm. The monomer was characterized by IR spectrum.

Example 3

Preparation of Monomer, B-(4-Penten-1-yl)-9-BBN

Following the procedure set forth in Example 1, 20 g of 1,4-pentadiene, together with 0.5 M, 150 ml of 9-BBN/THF solution, was added to the flask under a nitrogen atmosphere. The mixture was stirred at room temperature for overnight. Excess 1,4-pentadiene and THF were removed by high vacuum. The pure 11 g of B-(4-penten-1-yl)-9-BBN was distilled from resulted solution. The molecular structure of monomer was confirmed by means of IR spectroscopy.

Example 4

The Stability of Boranes in $TiCl_3AA-Al(Et)_2Cl$ Catalyst

The dry flask, equipped with a septum inlet and magnetic stirrer, was charged with 2.43 g, 12 mmole of $TiCl_3$. AA and 2.91 g of 24 mmole of $Al(Et)_2Cl$ in dry box. After the system was flushed with nitrogen and maintained under a pressure of the gas, 5 g 24 mmole of B-hexyl-9-BBN was added into the catalyst solution with the aid of a syringe. The mixture was well stirred at room temperature for overnight without any visible reaction. The heterogeneous catalyst complex was then removed from the mixture by filtration under argon atmosphere, and the unreacted (>4 g) B-hexyl-9-BBN was recovered by distillation from the filtrate in reduced pressure (20 μm) at 130° C.

Example 5

Preparation of Polyborane,

Poly-B-(7-Octen-1-yl)-9-BBN

In a 500 ml flask of 0.5 mmole of $TiCl_3.AA$, 3 mmole of $Al(Et)_2Cl$ and 64 ml of toluene were added under argon atmosphere. After sufficient mixing 43 mmole of B-(7-octen-1-yl)-9-BBN monomer was followed and resulting mixture was mechanically stirred at room temperature. A high viscous polymer gel-like solution was obtained after three hours reaction time. The polymerization was then terminated and polymer was precipitated by adding 200 ml of isopropanol. The resulting precipitate was collected by filtration in $N_2$ atmosphere. Additional washing with isopropanol was continued for three times before drying in vacuum for overnight. The overall yield in this Example was 92%, with the weight-average molecular weight above 3 millions in GPC measurement. The molecular structure of poly-B-(7-octen-1-yl)-9-BBN was identified by IR spectrum 2,925–2,850 cm$^{-1}$ (C—H stretching), 1,440 cm$^{-1}$ ($CH_2$ bending), 1,370 cm$^{-1}$ ($CH_2$ wagging), 720 cm$^{-1}$ ($CH_2$ rocking), without any vibration mode for vinyl group, as well as by $''B$ NMR spectrum resulted from chemical shift δ=88.5 ppm (relative to $BF_3$. $OEt_2$) corresponding to trialkylborane in polymer. The elementary analysis supported the result and the C:H:B atomic ratio of 16:29:1.

Example 6

Preparation of Poly-(1-Octen-8-ol)

In the inert atmosphere 6 g of polyborane from Example 5 was dissolved in 400 ml THF solution. A 5.3 ml (6N) NaOH solution was injected into the reactor, followed by dropwising 10.7 ml, 33% $H_2O_2$ at 0° C. for over 15 minutes. The resulting mixture was then heated up to 50° C. for 3 hours to complete the reaction. After cooling down to room temperature the polymer was then precipitated from solution by adding 200 ml hexane. Further purification was carried out by redissolving polymer into n-propanol and reprecipitating polymer from petroleum ether. The resulting wet polymer was adhesive to glass and metal. After drying the polymer in a vacuum oven for two days a glass-like poly-(1-octen-8-ol) was obtained.

Infrared spectrum of the resulting polymer, summarized in Table I, confirmed the molecular structure of poly-(1-octen-8-ol). The polymer was further characterized by $'H$ NMR spectrum with chemical shift δ=4.4 ppm for proton in hydroxyl group of poly-(1-octen-8-ol). Elementary analysis results (Table II) was in good agreement with the theoretical value and confirmed that quantitatively oxidation of polyborane can be achieved as those in organoboranes.

TABLE I

| Characteristics of the Infrared Spectrum of Poly-(Octen-8-ol) | | |
|---|---|---|
| Frequency (cm−1) | Relative Intensity | Assignment |
| 3,300 | Strong | O—H Stretching |
| 2,900 | Strong | C—H Stretching |
| 2,840 | Strong | C—H Stretching |
| 1,440 | Strong | C—H and O—H Bending |
| 1,370 | Medium | $CH_2$ Wagging |
| 1,050 | Strong | C—O Stretching |
| 720 | Medium | $CH_2$ Rocking |

TABLE II

| | Elemental Analysis of Results of Polyoctenol | | | | |
|---|---|---|---|---|---|
| $(C_8H_{16}O)_x$ | C | H | O | B | Total (%) |
| Theoretical Values | 75.0 | 12.5 | 12.5 | 0 | 100 |
| Experimental Values | 74.33 | 13.03 | 12.61 | 0.049 | 100.02 |

Example 7

Preparation of Borane Copolymer with 1-Octene

A half liter flask was charged with Ziegler-Natta catalyst, $TiCl_3AA$ (0.4 mmole, 0.08 g), $Al(Et)_2Cl$ (2.5 mmole, 0.3 g) and toluene (50 ml). After stirring the monomer mixture of B-(7-octen-1-yl)-9-BBN (22 mmole, 5.2 g) and 1-octene (22 mmole, 3.5 ml) was added with 50 ml of toluene. The polymerization was observed within five minutes with visible increase in viscosity. The solution was stirred at room temperature for two hours before the reaction was terminated with isopropanol (250 ml). The precipitate was collected by filtration, washed with isopropanol for three times and vacuum dried overnight to yield 6.2 g of copolymer. Trialkylborane in copolymers was characterized by $''B$ NMR with chemical shift δ=86.5 ppm from $BF_3OEt_2$. The IR spectrum: 2,940–2,840 cm$^{-1}$ (C—H stretching), 1,460 cm$^{-1}$ ($CH_2$ bending), 1,380 cm$^{-1}$ ($CH_3$ bending), 720 cm$^{-1}$ ($CH_2$ rocking), was in good agreement with the molecular structure of the copolymer. Borane copolymer was further converted to polymers with other functionalities (e.g.,—$NH_2$,—OH,—CHO) under mild conditions.

Example 8

Preparation of Alcohol Copolymer with 1-Octene

Borane copolymer from Example 7 was converted to polyalcohol having alkylene alcohol side chains as described below.

A solution of copolymer (5.5 g) in THF (350 ml) was placed in a one liter flask before adding 4.8 ml of 6 N sodium hydroxide. Hydrogen peroxide (30%, 9.8 ml) was then added over a period of 15 minutes. After stirring the mixture at 55° C. for three hours the water (300 ml) was added and the precipitate was collected by filtration and washed with water. Further purification was carried out by redissolving the copolymer in n-propanol, reprecipitating by acetone and drying in vacuum for overnight to obtain desired product (3.7 g). IR spectrum showed strong $\nu$O-H=3,300 cm$^{-1}$ and $\nu$C-O=1,050 cm$^{-1}$ indicated that borane group was converted to corresponding alcohol group. Elemental analysis results in Table III show quantitative conversion. Furthermore, the composition in copolymer, octene/octenol=1 was the same as that of monomer feed shown in Example 7.

TABLE III

| Elemental Analysis Results of Poly(Octenol-Co-octene) | | | | | |
|---|---|---|---|---|---|
| $[(C_8H_{16}O)_{0.5}(C_8H_{16})_{0.5}]_x$ | C | H | O | B | Total (%) |
| Theoretical Values | 80.0 | 13.4 | 6.6 | 0 | 100 |
| Experimental Values | 79.85 | 13.68 | 6.43 | 0.018 | 99.98 |

What is claimed is:

1. A homopolymer having the formula:

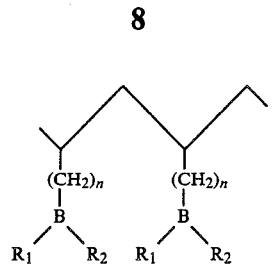

wherein n=b 6 to 12 and $R_1$ and $R_2$ are alkyl or cycloalkyl groups.

2. A homopolymer having the formula:

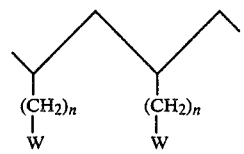

wherein n=3 to 12 and W is a functional group consisting of OH, NH$_2$ and CHO groups.

3. A random copolymer having the structure of

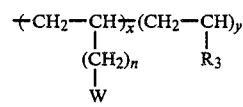

wherein n=3 to 12; x is about 1 to about 99 mole percent; y is about 99 to about 1 mole percent; $R_3$ is hydrogen or an alkyl group having about 1 to about 20 carbon atoms; and W is selected from the group consisting of OH, NH$_2$ and CHO groups.

* * * * *